Oct. 27, 1970
H. J. CAULFIELD
3,536,921
PASSIVE CONTROL OF FOCAL DISTANCES
Filed March 31, 1967
2 Sheets-Sheet 1
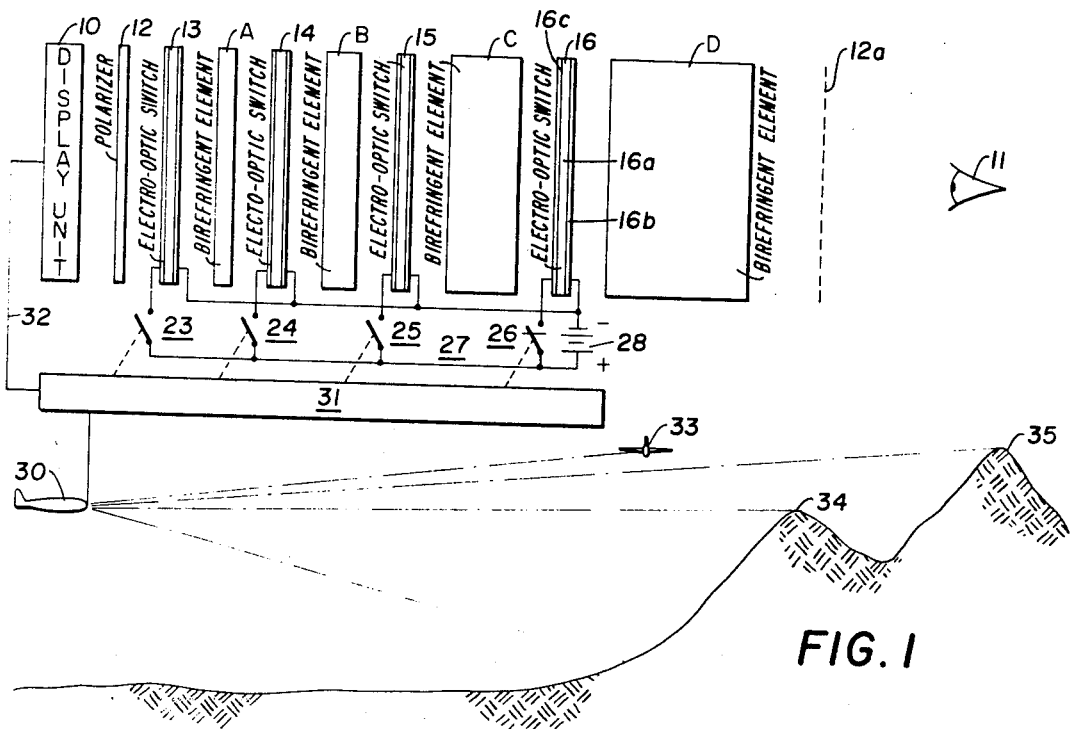
FIG. 1
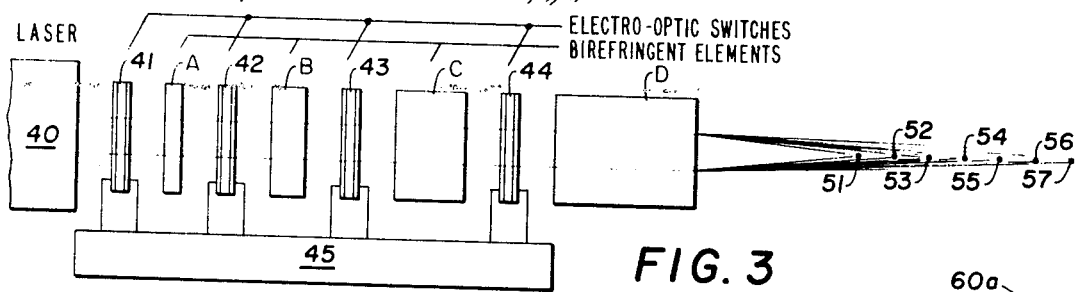
FIG. 3
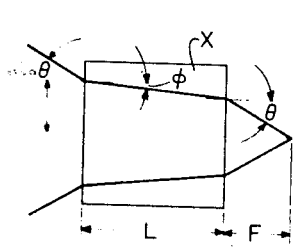
FIG. 2
FIG. 5
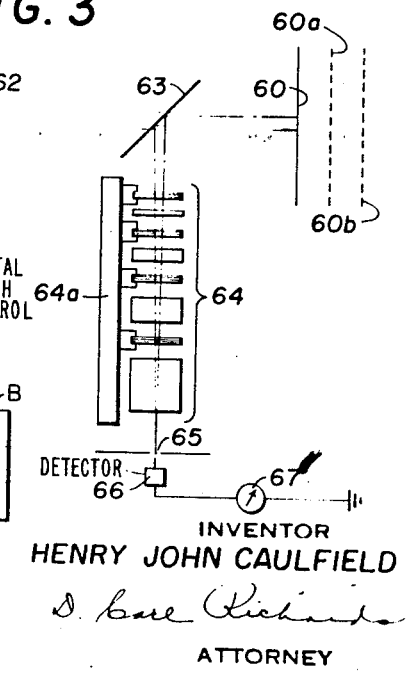
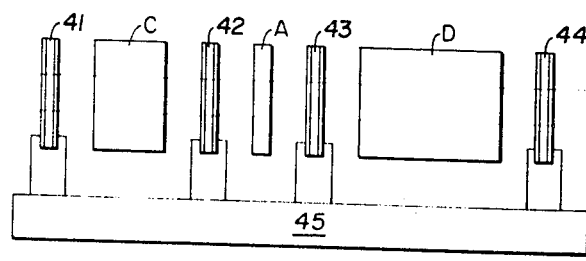
FIG. 4
INVENTOR
HENRY JOHN CAULFIELD
ATTORNEY

INVENTOR
HENRY JOHN CAULFIELD

ATTORNEY 3,536,921
PASSIVE CONTROL OF FOCAL DISTANCES
Henry John Caulfield, Richardson, Tex., assignor to Texas
Instruments Incorporated, Dallas, Tex., a corporation
of Delaware
Continuation-in-part of application Ser. No. 582,325,
Sept. 27, 1966. This application Mar. 31, 1967,
Ser. No. 644,744
Int. Cl. H04b 9/00; H04l 9/54
U.S. Cl. 250—199          15 Claims

ABSTRACT OF THE DISCLOSURE

A method and system for varying the focal distance of a lens without changing the magnification or spot size by use of a stack of passive digitally dimensioned birefringent elements in conjunction with a like number of polarization switches.

---

This is a continuation-in-part of the application of Henry John Caulfield, Ser. No. 582,325, filed Sept. 27, 1966, now abandoned.

Where it is desired to control the focal distance of a lens, the alternatives available include the fabrication of the lens from an electro-optic material in order to achieve, through a voltage change, the control of the focal length. However, because of the small changes available in refractive index and variation in magnification with accompanies the change in refractive index, difficulties are inherent in this approach.

It has been found that systems can be formed providing a large change in refractive index without changing the magnification by using naturally birefringent materials to control the optical path length through which the light travels. More particularly, in accordance with the present invention, light emerging from a plane polarizer plate converges to a point whose distance from said plate varies with the index of refraction of the birefringent material through which the light passes. Said material is of a uniaxial crystalline character such that when illuminated along its optic axis either of two focal points may occur, one focal point occurring when the impinging light is polarized in a plane perpendicular to the material's optic axis, and the other occurring when said light is polarized in a plane horizontal to said optic axis. Polarized light, in accordance with the present invention, is made to focus at either of these points by the use of polarization switches or by the insertion or withdrawal of a half wave plate. More particularly, a focal point converter placed between an image and viewer includes a plane polarizer plate followed successively by a stack of polarization switches with a birefringent plate located immediately following each of the switches. In a preferred embodiment, the birefringent bodies have different lengths related one to the other in accordance with predetermined function.

More particularly, there is provided a lens system in which the focal distance which may be changed without a change in magnification. A plane polarizer is employed for transmission of incoming light to the system. A plurality of sets of elements are then provided through which the light from the polarizer may pass. Each set includes a polarization switch and a passive birefringent element. Means are then provided for selectively actuating the polarizing switches. Preferably the lengths of the birefringent elements are graded in accordance with the sequence 1, 2, 4 and 8.

Further, the polarization switches preferably are electro-optic bodies each having a means for production therein of an electric field in the direction of light travel upon application of a voltage thereto and means are provided for selectively applying voltages thereto.

In accordance with this invention, there is provided a light transmission system including a plane polarizer for polarizing incoming light that is transmitted through a plurality of sets of elements with each set including a polarization switch and a passive birefringent element oriented for passage of light therethrough along the optic axis thereof, the polarization switches are selectively actuated to change the polarization of the transmitted light to effectively change the focal distance in dependence upon the combined length of the elements in the sets in which switches are actuated.

For a more complete understanding of the present invention and for further objects and advantages thereof, references may now be had to the following description taken in conjunction with the accompanying drawings.

FIG. 1 illustrates an embodiment of the invention wherein a two-dimensional display is changed to a three-dimensional display;

FIG. 2 is a diagram explanatory of FIG. 1;

FIG. 3 illustrates an embodiment of the invention wherein coherent polarized light is focused at different depths of focal distances without change in magnification;

FIG. 4 is a modification of FIG. 3;

FIG. 5 is an embodiment of the invention in depth measuring system; and

Figure 6:
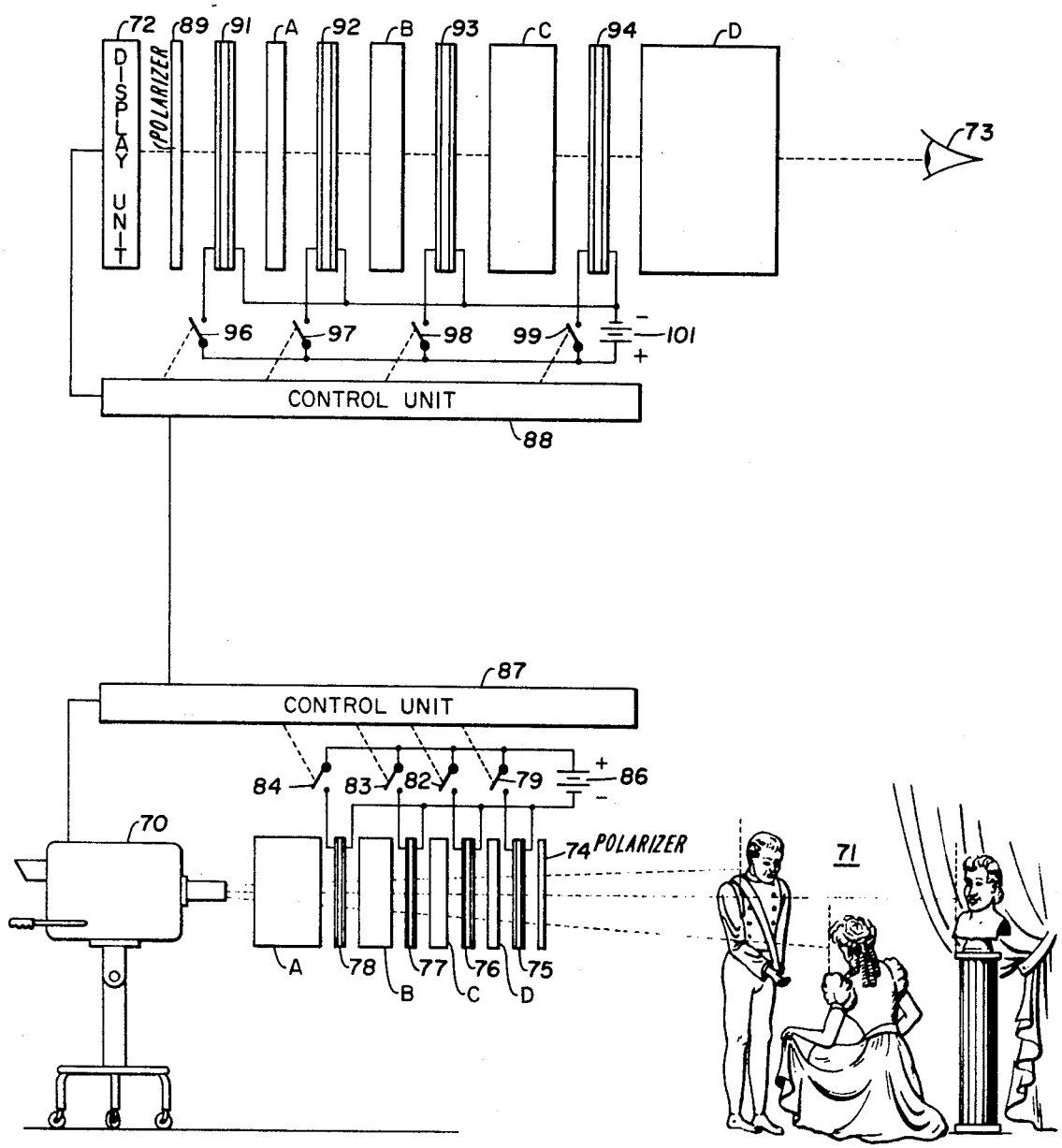
FIG. 6 illustrates an embodiment of the invention wherein an image is changed in a three-dimensional signal and a two-dimensional display of the signal is changed to a three-dimensional display.

In one aspect of the invention, pairs of polarization switches and passive birefringent elements are employed to convert a two-dimensional white light display to a three-dimensional display. Where N birefringent elements of lengths related one to the other in accordance with the sequence 1-2-4-8 etc. are employed, a total of $2^N$ equally spaced focal positions may be achieved. With a total length L of birefringent material having indices of refraction $n$ and $n+\Delta n$, the total shift in focal distance can be as high as $L\Delta n/n^2$. In a ten stage device any one of 1024 positions could be selected. Such a result is achieved without change in the magnification or the image spot size. It will be understood that the shift in focal distance may be magnified optically to arbitrary distances, but in so doing, the image or spot size is also magnified.

Referring now to FIG. 1, a system is provided wherein a display unit 10 provides wide band or white light image which is viewed by an observer 11. The display unit 10 provides a two-dimensional presentation as on a cathode ray tube. Four birefringent elements A, B, C, and D are employed to cause the image from display unit 10 to appear to have variable depth or be three-dimensional, with four digitally dimensional units. The depths are selectable over a range of sixteen equally spaced points.

More particularly, light from the display unit 10 is changed to plane polarized light by the plane polarizer 12. The plane polarized light then passes through an electro-optic switch 13 and thence through a birefringent body A. The light then passes through a second electro-optic switch 14 to a birefringent body B, through an electro-optic switch 15, birefringent body C, electro-optic switch 16, and birefringent body D.

The switches 13–16 are connected by way of channels 23–26 through switches in unit 27 switch, to a D.C. voltage source 28. The switches 13–16 may be of identical construction. Each includes a sheet of electro-optic material such as the sheet 16a with transparent metallic coatings 16b and 16c. The conductors of channel 26 are connected to the two thin films 16b and 16c. When a D.C. voltage is applied to the channel 26, an electric field is produced through the electro-optic sheet 16a in the direction of travel of light therethrough.

Each of the electro-optic sheets in switches 13, 14, 15 and 16 are aligned to produce a maximum phase shift between the two components into which the light is broken in response to establishment of an electric field therein. In use, with zero voltage on a given element, the phase shift will be zero. Upon application of a switching voltage thereto to establish such field, the phase shift will be changed by 90°. When the electro-optic material in the units 13–16 is required to have large area, sodium niobate ($NaNbO_3$) may be satisfactory. Such a material is described by N. F. Barrelli et al. in Applied Physics Letters, vol. 7, p. 117, 1965. A sheet of such material may be initially oriented by employing the polarizer 12 and a second polarizer (not shown) at location 12a. The polarizer 12 and the second polarizer at location 12a may be oriented with their planes of polarization at 90° one with respect to the other. A voltage is then applied to a given one of the channels, for example channel 26. The electro-optic body 16 is then rotated until the maximum light passes through the polarizer at location 12a for a minimum switching voltage from source 27. At such orientation the phase shift is 90°.

Alternatively, the polarizers may be oriented with their planes of polarization parallel. The electro-optic body 16 would then be rotated until minimum light is transmitted with minimum switching voltage. In either case, a maximum phase shift is produced between the two components into which the light is broken by minimum voltage. Each of the other sheets 13–15 may then be adjusted for proper optical orientation as above described. Thus, the system operates in an ON-OFF mode, with a voltage from source 27 being applied to channels 23–26 to provide a three-dimensional display of the information on the unit 10.

Where single crystal units may be employed, the electro-optic body 16 may be of potassium dihydrogen phosphate (KDP), potassium tantalum niobate (KTN), barium titanite ($BaTiO_3$) or other such materials. Single crystal units may be employed where the display on unit 10 is projected by a suitable lens system onto a viewing screen with single crystal light switches and small birefringent elements integrated in the system. The birefringent elements may be single crystals of calcite or sodium nitrate. As will be explained, they may be formed of combinations of elements of different refractive indices.

In FIG. 1, the display unit 10 has been described as a cathode ray screen which would be used in a radar presentation in an aircraft 30. A terrain-following or forward looking radar in aircraft 30 may sweep both elevation and azimuth. Such a radar control unit 31 in plane 30 applies conventional control signals over channel 32 to provide on unit 10 a two-dimensional presentation of information sensed by sweeping the radar beam between selected limits both in azimuth and elevation. A second aircraft 33 at relatively close range and mountain peaks 34 and 35 at successively increasing ranges would also appear on the display unit 10. Ordinarily such radar return information is presented on the unit 10 in varying shades of gray with the darker shade representing closer objects or early returns. In the present case, the presentation of information on display unit 10 may be either in varying shades of gray or in equal shades. In either case unit 31 is connected to the control unit 27 to provide switching action which is dependent upon and synchronized with the sweep of the radar and the times at which the radar returns are received. Thus, the same intensity modulation voltage employed in the radar to modulate the cathode beam in the display unit 10 may be employed in the unit 31 to select the sets of switches in channels 23–26 to be closed and the times of such closure.

It will be appreciated that in the system shown in FIG. 1, the four birefringent elements A–D provide for sixteen different depth positions. In a ten unit system, 1024 different depth locations are available. Thus, a digital 2D to 3D converter is employed wherein the channels 23–26 are selectively energized to apply switching voltages to the switches 13–16. The unit 31 may include a suitable analog-to-digital converter to close switches in the channels 23–26 selectively to apply a unidirectional voltage from other sources represented by battery 28 in dependence upon the range of a given radar return signal.

FIG. 2 has been included for purpose of aiding and understanding of the invention and for verification of the foregoing birefringent material or crystal X of length L and refractive index $n$ through which focused light passes has a focal length F which may be defined in terms of FIG. 1 as follows:

$$F+H \cot \theta - L \cot \theta \tan \phi \quad (1)$$

If the refractive index is changed from $n$ to $n+\Delta n$, then the focal length changes to $F+\Delta F$. Where $\Delta n$ is very much smaller than $n$, $\Delta F$ may be defined as follows:

$$\Delta F = L \frac{n \Delta n}{n^2 - \sin^2 \theta} \sqrt{\frac{1 - \sin^2 \theta}{n^2 - \sin^2 \theta}} \quad (2)$$

For small angles, that is, where $\sin^2 \theta$ is very much less than 1, the change in focal length may be defined by the following expression:

$$\Delta F = L \frac{\Delta n}{n^2} \quad (3)$$

The effect of change in the refractive index is simply to shift the lens along the optic axis of a collimated beam by an amount $\Delta n$. Therefore, the spot size does not change with the change in focal length.

If the crystal X of FIG. 2 has a length L and its optic axis in the $\theta = 0$ direction, light passing through the crystal will experience an index of refraction $n$ or $n+\Delta n$, depending upon its polarization state.

For example, in a birefringent material such as calcite, $\Delta n/n^2 \approx 0.10$ for visible light. Each cm. of calcite can produce a change in focal distance of about 1 mm. In $NaNO_3$, $\Delta n/n^2 \approx 0.15$. For both materials, there is some dispersion in $\Delta n/n^2$.

From the above it is seen that a bistable device can produce a focal distance shift of $L\Delta n/n^2$. For intermediate positions, crystal X must be broken into multiple segments A–D, as in FIG. 1, and each segment must be provided with a switch capable of rotating the plane of polarization of the light through an angle 90°. Crystal X of FIG. 2 may be considered as cut into N segments A–D of FIG. 1 such that the $n$th segment has length $$l_n = 2^{n-1} l_1 \quad (4)$$

and therefore $$l_1 = L/(2^N - 1) \quad (5)$$

Proper addressing of such a system can produce any shift corresponding with the expression:

$$\Delta L_m = m l_1 \Delta n / n^2 \quad (6)$$

where $0 \leq m \leq 2^N - 1$. Thus, there are $2^N$ focal distances available. These distances are equally spaced by an amount $l_1 \Delta n / n^2$.

It can be shown that the number R of resolvable positions is $R = AL/d_o$, where $d_o$ is the depth of the field. Consider the case where $k = 2\pi/\lambda \cong 10^5$ cm.$^{-1}$ for the He-Ne visible line, Z = displacement along the optic axis from the focal plane,
r = displacement from the optic axis, and
NA = (lens radius/lens focal length).

Using a material where $k = 10^5$ cm.$^{-1}$, $L = 4.8$ cm. $\Delta n/n^2 = 0.1$, and $NA = 0.25$ (half angle = 15°, the number of resolvable positions $R = 1000$. Thus, a ten stage (1024 position) focal point unit may be considered.

In FIGS. 1 and 3 it will be noted that the birefringent bodies A–D are arranged in an ordered sequence with the shortest body A being closest to the light source and the longest body D being most remote.

In FIG. 4 the sequence is random. In either case the members of the set of polarization switches may be selectively energized and de-energized as may be required to provide the desired focal length. An ordered sequence is preferred in that the polarization switches will be activated in a usual digital sequence to change the focal distance progressively in distance units.

FIG. 5 illustrates a modification of the invention wherein a precise depth measurement is achieved. This system provides for location or measurement of the distance to an object having a surface 60 or variations in the location of such object. This surface may vary in location to occupy positions 60a and 60b, etc.

The measuring system, fixed in position, includes a source of coherent light such as a laser 61 and a focusing lens 62. Light from the lens 62 passes through a half-silvered mirror 63 and strikes the surface 60. Reflected light strikes the mirror 63 and is reflected downward through the digital depth controller 64 and then through an aperture 65 to a detector 66 such as a photocell. The detector 66 serves to energize or control an indicating device represented by meter 67 in manner well known in the art. Where the aperture 65 is small, a large percentage of the light reflected downward by mirror 63 will be detected by detector 66 only if the focal point, as controlled by controller 64, lies in the plane of the aperture 65. The focal point may be varied in position by selectively energizing the electro-optic switches in the controller 64 as by adjustment by the unit 64a. If the target plane moves, thus decreasing the light sensed by detector 66, readjustment can then be made by controller 64 to produce maximum deflection upon meter 67. The distance the target plane moves may then be determined from the difference between new and prior switch settings in the control unit 64a.

In FIG. 3 a system that may be termed a laser drill system has been illustrated wherein light from a laser 40 passes through switches 41–44. Birefringent bodies A–D located successively along the light path with one birefringent body being on the side of each switch opposite the source 40. A control unit 45 is provided for selective actuation of the switches 41–44 so that the coherent light from source 40 may be brought to a focus at any one of sixteen points 51–52 . . . 57, etc. Thus, the system may be considered to be a laser drill press or laser lathe where the light from the source 40 may be brought to a focus at different distances. A pulsed ruby laser would be preferred for the laser 40 in this embodiment of the invention in order to deliver the desired energy to the work location. By selectively energizing the switches 41–44, the focused beam will be invariant in size while the focal distances are varied. Thus, highly accurate control well below the minimum dimensions of available mechanical devices is possible. It is possible to make a combination of a mechanical-electro-optic device in which coarse adjustment to 0.001 inch is accomplished mechanically and a fine adjustment is accomplished electro-optically down to 0.000001 inch. The birefringent bodies A–D should be of materials wherein the values of $\Delta n/n^2 \ll 0.1$. Virtually all birefringent materials have such values of $\Delta n/n^2$ between $10^{-2}$ and $10^{-5}$. Thus, a large number of materials are known for which L would be sufficiently large to permit use in this system.

It will now be appreciated that such a system may be employed to determine the amplitude of harmonic vibration of a body having such a target surface such as surface 60. Similarly, the average amplitude of random vibrations may be measured by employing suitable elements the system represented by meter 67. Such elements and system components are well known and may operate upon the signal produced in the manner illustrated in FIG. 5.

In another aspect of the invention, pairs of polarization switches and passive birefringent elements are simultaneously employed to change the focal distance of a camera, and to convert a two-dimensional white light display to a three-dimensional display. Where N birefringent elements of lengths related one to the other in accordance with the sequence 1–2–4–8 . . . etc. are employed, a total of $2^N$ equally spaced focal planes and focal positions may be achieved. With a total length L of birefringent material having indices of refraction n and $n+\Delta n$, the total shift in focal distance can be as high as $L\Delta n/n^2$.

Referring now to FIG. 6, a system is provided wherein the usual lens system of a television camera 70 is focused on one plane of the scene 71. The television camera 70 converts the scene 71 into a two-dimensional signal which is transmitted to a display unit 72 and shown thereon as a two-dimensional presentation as on a cathode ray tube. Four birefringent elements A, B, C, and D are employed between the scene 71 and the television camera 70 to cause the television camera to focus on one of sixteen separate planes. Similarly, four birefringent elements A, B, C, and D are employed between the display unit 72 and a viewer 73 to cause the image from the display unit to appear to have variable depth or be three-dimensional. The depths that are selectable in the transmission and receiving units range over sixteen equally spaced points.

More particularly, light from the scene 71 is changed to plane polarized light by a polarizer 74. The plane polarized light then passes through an electro-optic switch 75 and then through a birefringent body D. The light then passes through a second electro-optic switch 76 to a birefringent body C, through an electro-optic switch 77, a birefringent body B, electro-optic switch 78 and birefringent body A. The light is then transmitted to the lens system of the television camera 70. The switches 75–78 are connected by way of channels 79, 82, 83 and 84, respectively, to a D.C. voltage source 86. The electro-optic switches 75–78 are identical to those described with reference to FIG. 1.

The channels 79, 82, 83 and 84 are connected to a control unit 87. To produce a three-dimensional signal from the television camera 70, the electro-optic switches are energized in a continuously repeating sequence. Each cycle being completed in a span of time less than what can be perceived by the human eye, approximately 1/30th of a second. As the electro-optic switches are energized in a continuous sequence, the television camera 70 will be focused on any one of sixteen possible planes in the scene 71. The signal generated by the television camera 70 will be a representation of the sixteen planes on which the camera is continuously focused.

The signal generated by the television camera 70 is transmitted to a control unit 88 associated with the display unit 72 and displayed thereon in varying shades. For the viewer 73 to see a three-dimensional display, light from the display unit 72 is changed to polarized light by a polarizer 89. After passing through the polarizer 89, the light then passes through an electro-optic switch 91, a birefringent body A, an electro-optic switch 92, a birefringent body B, through an electro-optic switch 93, birefringent body C, electro-optic switch 94 and birefringent body D. The switches 91–94 are connected by way of channels 96–99 to a D.C. voltage source 101. The switches 91–94 are the same as switches 75–78 and have been thoroughly described with reference to FIG. 1. The channels 96–99 are mechanically connected to the control unit 88.

In operation, the electro-optic switches 75–78 and 91–94 are energized in a continuous sequence and synchronized with each other. That is, when a given arrangement of the electro-optic switches in the transmitting section are energized, the same electro-optic switches will also be energized in the receiving section. Each sequence is completed in less than the integration time of a human viewer. As the electro-optic switches 75–78 and 91–94 are sequenced, the television camera 70 generates a signal which is transmitted to the display unit 72 and converted to a three-dimensional display for the viewer 73. To the viewer 73, it appears that each subject of the scene 71 was in the proper perspective as if he were present at the scene.

It should be appreciated, that the television camera 70 can be replaced by a camera using photographic film and that a similar substitution could be made at the display unit. At the display unit, the photographic film would be displayed on a screen using a standard movie projector and the 2–D to 3–D system placed between a viewer and the display screen.

Having described the invention in connection with certain specific embodiments thereof, it is to be understood that further modifications may now suggest themselves to those skilled in the art and it is intended to cover such modifications as fall within the scope of the appended claims.

What is claimed is:

1. A two-dimensional to three-dimensional converter system comprising:
   (a) a two-dimensional display responsive to time-scaled signals,
   (b) a plurality of light-transmitting plates comprising polarization switches and birefringent plates located alternately along the path of light passing from said display,
   (c) a plane polarizer between said display and said light transmission plates, and
   (d) means for selectively actuating said switches in dependence upon said time-scaled signals whereby the focus point of light transmitted through said plates is correspondingly varied, thus enabling a viewer to perceive a three-dimensional display.

2. The combination set forth in claim 1 wherein said birefringent plates are oriented for passage of light therethrough along the optic axes thereof.

3. The combination set forth in claim 1 in which said birefringent elements are of different lengths and related one to the other in accordance with the series 1–2–4–8 . . . etc.

4. The combination set forth in claim 3 wherein said birefringent plates and said switches are of the order of ten in number.

5. A light transmission system which comprises:
   (a) a source of plane polarized light,
   (b) a plurality of sets of elements through which said polarized light may pass wherein each set includes a polarizer switch and a passive birefringent element oriented for passage of said polarized light therethrough along the optic axis thereof,
   (c) a partially reflecting mirror in the light path between said source and said sets and positioned to direct light traveling back along the path of said polarized light into said sets,
   (d) a light sensor, structure between said sensor and said sets having an aperture in the path of light from said mirror to said sensor, and
   (e) means for selectively activating said switches to bring to focus at the plane of said aperture light from said sets for maximum transfer of light through said aperture to said sensor whereby the condition of said switches for maximum output of said sensor is representative of the distance from said mirror to a reflecting object in the path of light from said source.

6. The combination according to claim 5 wherein said source is a laser.

7. A three-dimensional image transmitting an image display system comprising:
   an image transmitter,
   a plurality of light transmitting plates,
   a plane polarizer between an image and said light transmitting plates,
   said plurality of plates including, alternately, polarization switches and birefringent plates successively located along the path of light passing from said image through said polarizer to said image transmitter,
   two-dimensional receiving means,
   means for transmitting a signal representing the image from said transmitter to said receiver,
   a second plurality of light transmitting plates,
   a second polarizer between said two-dimensional receiver and said second plurality of plates,
   said second plurality of plates including, alternately, polarization switches and birefringent plates successively located along the path of light passing from said display through said polarizer, and
   means for actuating said switches of said first and second plurality of plates to produce a three-dimensional display.

8. A three-dimensional image transmitter and image diplay system as set forth in claim 7 including means for synchronizing the actuation of said switches at said transmitter and said receiver.

9. A three-dimensional image transmitter and image display system as set forth in claim 7 wherein each of said switches is actuated at least once during the integration time of a human viewer.

10. A three-dimensional image transmitter and image display system as set forth in claim 8 wherein said polarization switches are electro-optic bodies each having means for production therein of an electric field in the direction of light travel upon application of a voltage thereto.

11. A three-dimensional image transmitter and image display system as set forth in claim 7 wherein said birefringent elements are graded in accordance with the sequence 1–2–4–8 . . . etc.

12. A three-dimensional image display system comprising:
   a plurality of light transmitting plates,
   a plane polarizer between an image and said plurality of transmitting plates,
   said plurality of plates including, alternately, polarization switches and birefringent plates successively located along the path of light passing from the image through said polarizer,
   means for recording the light intensity transmitter through said plates from said image,
   means for actuating the switches of said plurality of plates at least once during the integration time of a human viewer,
   means for converting said recording into a two-dimensional display,
   a second plurality of light transmitting plates,
   a plane polarizer between said two-dimensioned display and said second plurality of plates,
   said second plurality of plates including, alternately, polarization switches and birefringent plates successively located along the path of light passing from said display through said second polarizer, and
   means for actuating switches of said second plurality of plates at least once during the integration time of a human viewer.

13. A three-dimensional display as set forth in claim 12 wherein switches in said first and second plurality of plates are operated in identical sequences.

14. A three-dimensional display as set forth in claim 12 wherein said recording means is a television camera and said converting means is a cathode ray tube display unit.

15. A three-dimensional display as set forth in claim 14 including means for transmitting an image signal from said television camera to said display unit.

References Cited

UNITED STATES PATENTS

| 3,402,297 | 9/1968 | Harris | 250—199 |
|---|---|---|---|
| 3,410,624 | 11/1968 | Schmidt | 350—150 |

ROBERT L. GRIFFIN, Primary Examiner

A. J. MAYER, Assistant Examiner

U.S. Cl. X.R.

178—6.5; 350—150